C. W. MICHAEL.
CULTIVATOR.
APPLICATION FILED JUNE 7, 1906.
936,012.
Patented Oct. 5, 1909.
4 SHEETS—SHEET 3.
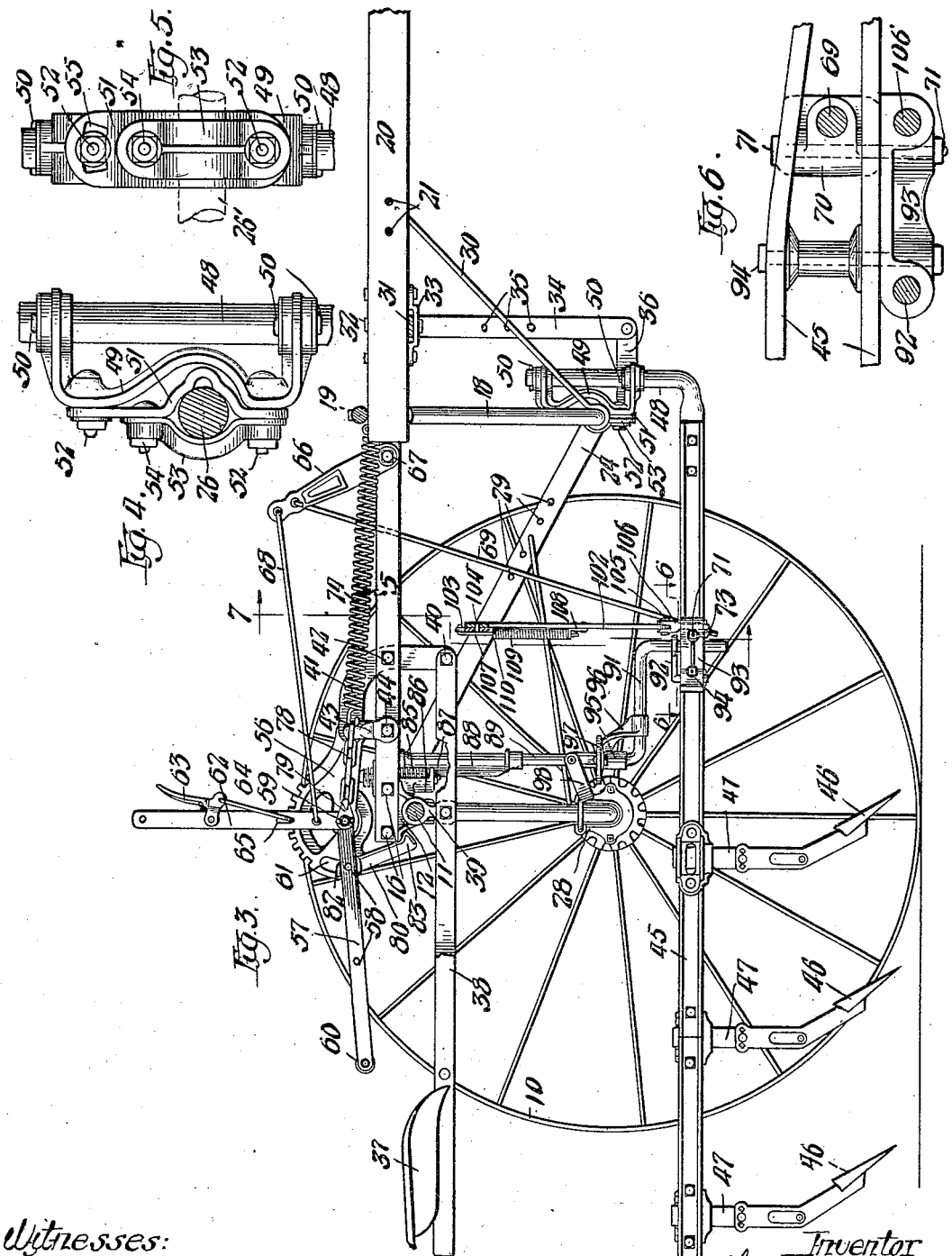

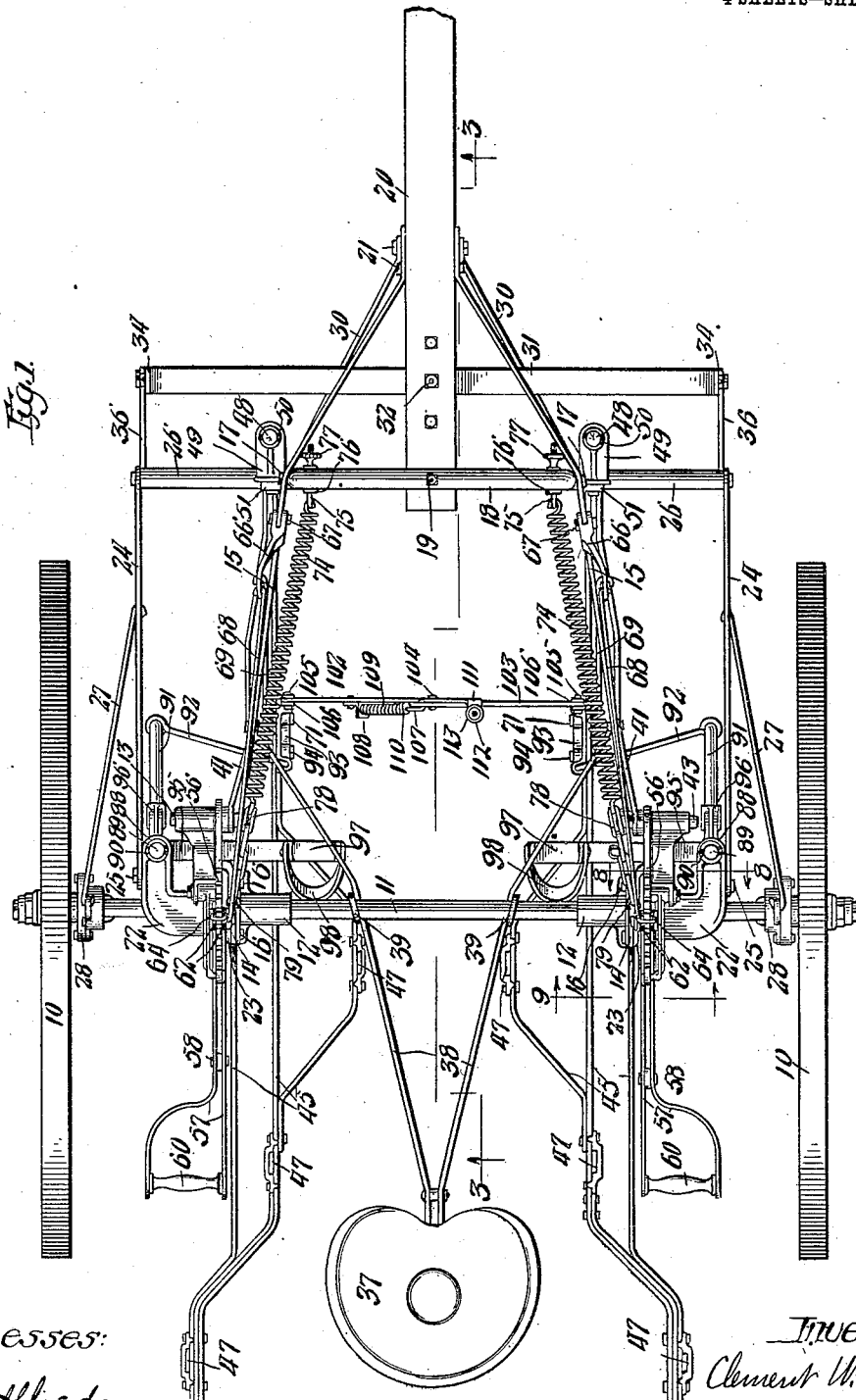

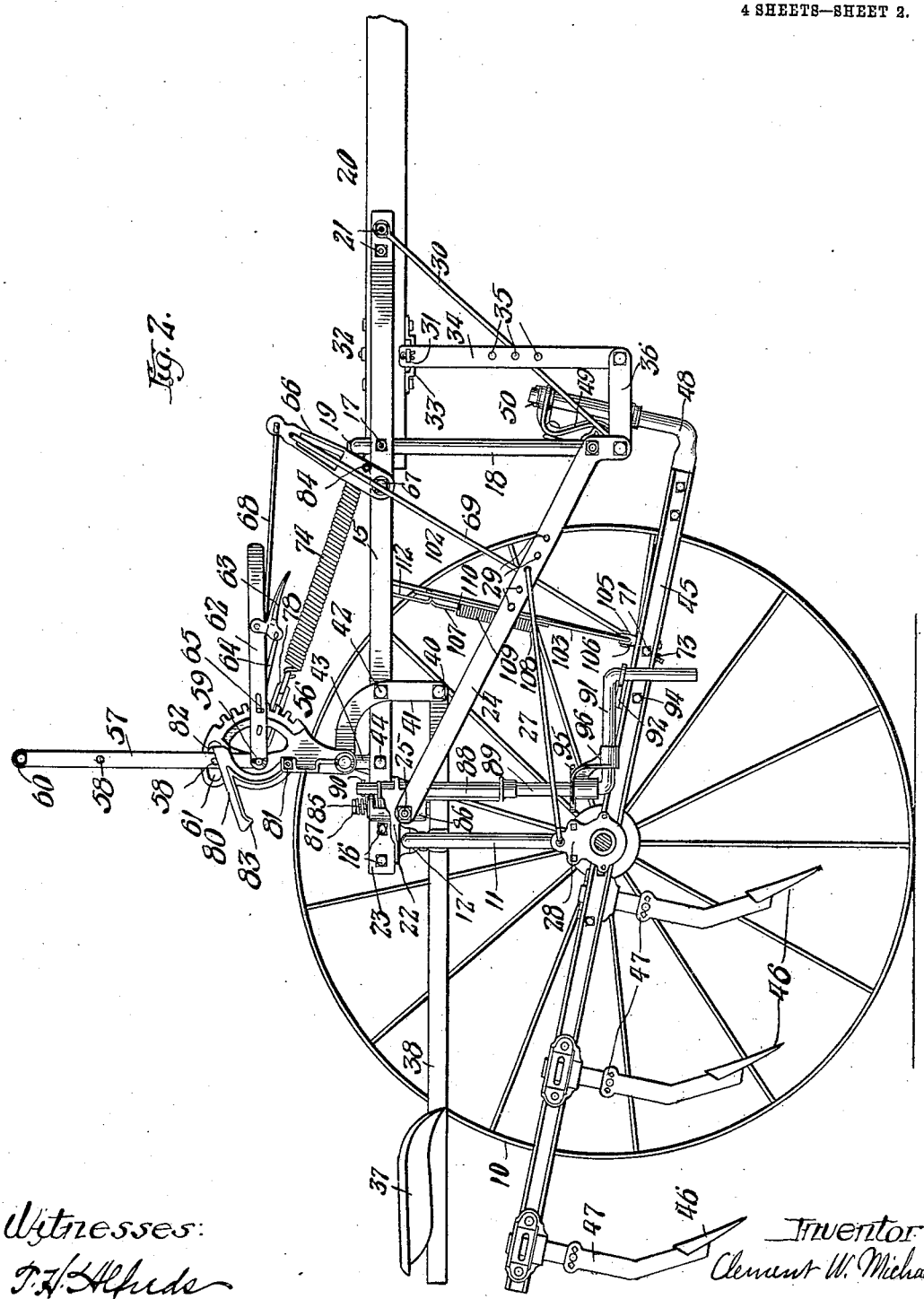

C. W. MICHAEL.
CULTIVATOR.
APPLICATION FILED JUNE 7, 1908.
936,012.
Patented Oct. 5, 1909.
4 SHEETS—SHEET 4.
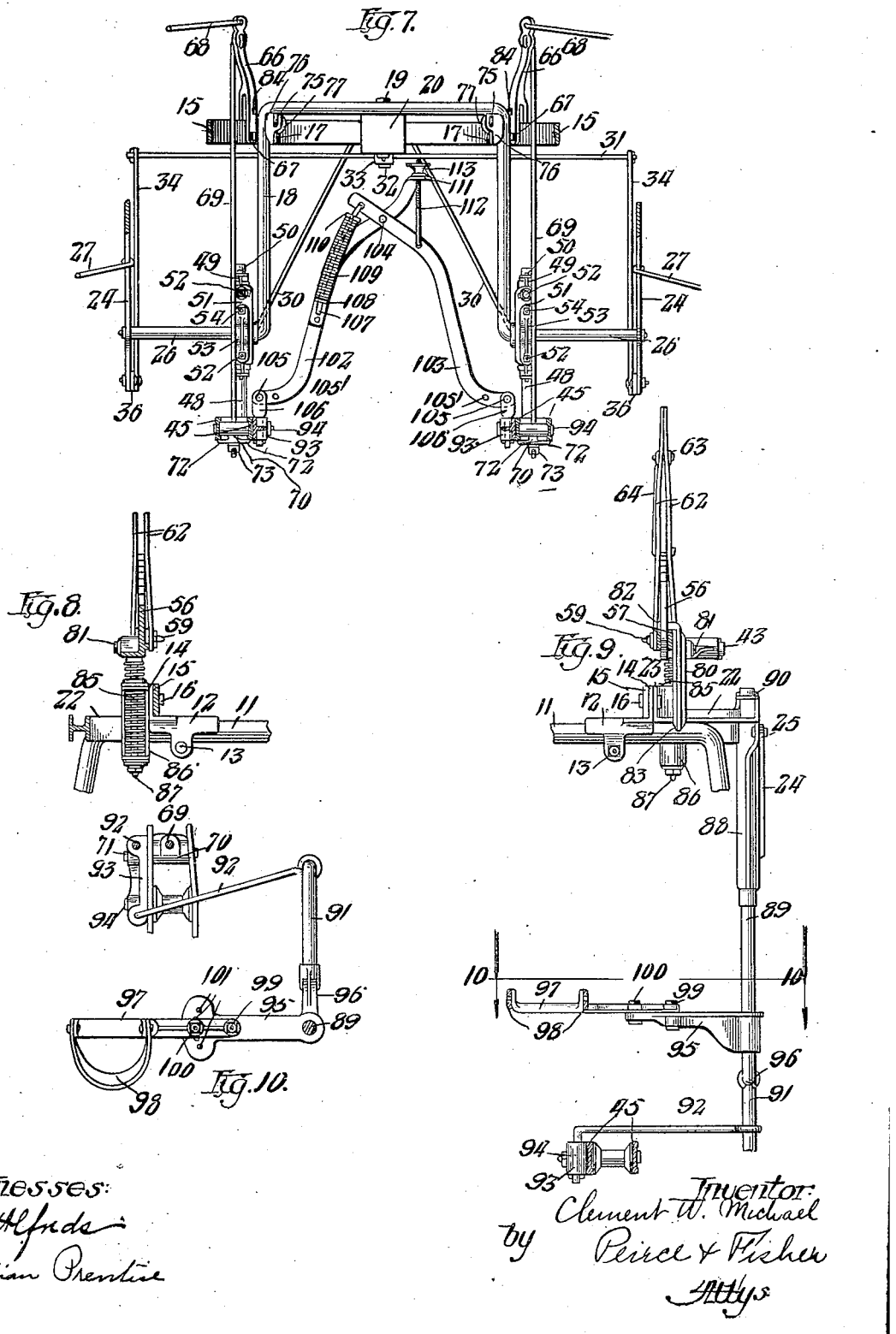

UNITED STATES PATENT OFFICE.

CLEMENT W. MICHAEL, OF RACINE, WISCONSIN, ASSIGNOR TO J. I. CASE PLOW WORKS, OF RACINE, WISCONSIN, A CORPORATION.

CULTIVATOR.

936,012. Specification of Letters Patent. Patented Oct. 5, 1909.

Application filed June 7, 1906. Serial No. 320,506.

*To all whom it may concern:*

Be it known that I, CLEMENT W. MICHAEL, a citizen of the United States, and a resident of Racine, county of Racine, and State of Wisconsin, have invented certain new and useful Improvements in Cultivators, of which the following is declared to be a full, clear, and exact description.

The improvement relates to riding or wheeled cultivators and the invention seeks to provide suitable mechanism whereby the ground tools may be easily and quickly raised and lowered from and to working position, together with means for adjusting the depth or extent of penetration of the ground tools, which depth regulating means may be adjusted in position without disturbing the raising and lowering device, and which remains in adjusted position during the operation of the raising and lowering means.

With these and other objects in view the invention consists in the features of construction, combinations and arrangements of parts hereinafter set forth, illustrated in the accompanying drawings and more particularly pointed out in the appended claims.

In the drawings, Figure 1 is a plan view of the improved cultivator. Fig. 2 is a view in side elevation of the same with the near wheel removed and with the ground tools in raised position. Fig. 3 is a central, vertical section of the same on line 3—3 of Fig. 1, with the ground tools in lowered or working position. Fig. 4 is a detail side elevation on an enlarged scale of the coupling for the forward upturned ends of the shovel beams. Fig. 5 is a view of the rear face of the coupling. Fig. 6 is a detail plan view of a portion of the shovel beams with parts shown in section on the line 6—6 of Fig. 3. Fig. 7 is a detail elevation showing the yielding connection between the shovel beams with parts in section on line 7—7 of Fig. 3. Figs. 8 and 9 are detail sections on the line 8—8 and line 9 respectively of Fig. 1. Fig. 10 is a detail plan view with parts shown in section on the line 10—10 of Fig. 9.

The cultivator is of the "straddle row" type and the supporting wheels 10 are journaled upon spindles at the ends of an arched axle 11. A pair of brackets 12 (see Figs. 1, 8 and 9) are mounted upon the ends of the upper, horizontal portion of the arched axle and are secured thereto by bolts 13. These brackets are provided with upwardly extending flanges 14 to which the rear ends of the side bars 15 of the frame are secured by bolts 16. The side bars 15 extend forwardly from the arched axle 11 and converge slightly toward each other. Adjacent their forward ends (see Figs. 1 and 2) the side bars are secured by bolts 17 to an arch 18 that is centrally connected by a bolt 19 to the tongue 20. From the arch 18 the side bars converge forwardly at a sharper angle and are secured by bolts 21 to the sides of the tongue 20. Brackets 22 (see Figs. 1, 2, 8 and 9) are provided with upwardly projecting flanges 23 and are secured by the bolts 16 to the flanges 14 of the brackets 12. Brace bars 24 are secured at their rear ends by bolts 25 to the brackets 22 and extend forwardly and downwardly therefrom. The forward ends of these brace bars are secured to the ends of the horizontal spindles 26 at the lower portions of the arch 18. Brace rods 27 are connected at their rear ends to brackets 28 on the horizontal spindles of the arched axle and at their forward ends are each arranged to engage one of a series of holes 29 in the adjacent brace bar 24. By adjusting the brace rods 27, the depending portion of the arched axle may be swung back and forth and set in proper position to properly balance the machine with riders of different weight. Brace rods 30 (see Figs. 1, 2, 3 and 7) are provided with loops at their rear ends which extend about the spindles 26 of the arch 18 adjacent the vertical portions of the arch, and these brace rods extend upwardly and forwardly and are connected by one of the bolts 21 to the pole 20. A draft-evener 31 is pivoted on the under side of the pole 20 by a bolt 32 and extends between the pole and a strap 33 (see Fig. 3) that is bolted to the under face thereof. Links 34 swiveled to and depending from the ends of the draft-evener 33 are provided with a series of holes 35 and afford suitable attachment for the swingletrees. The lower ends of these links are connected by links 36 to the forward downturned ends of the brace bars 24.

A rider's seat 37 is mounted upon the rear ends of a pair of horizontal bars 38 which extend forwardly and diverge outwardly therefrom. Supporting loops 39 secured to the seat bars 38, extend around the upper, horizontal portion of the arched axle. At their forward ends the seat bars are connected by bolts 40 to the lower ends of incurved brace bars 41 which are secured, intermediate their ends, by bolts 42 to the side bars 15 of the frame. The upward and rearwardly extending ends of the brace bars 41 engage upright brackets or lugs 43, which are secured by bolts 44 to the side bars 15.

The shovel beams may be of any usual or suitable construction, but each is preferably formed of separate sections 45 bolted together in off-set relation to carry the shovels 46 on the shanks 47 in proper position. At their forward ends the sections 45 of the shovel beams are secured to upright standards 48 that extend through suitable bearings in the arms of the U-shaped members 49 of the couplings. Pins 50 hold the beam standards within the couplings so that the shovel beams are free to swing in lateral or horizontal direction. A strap 51 is secured to the U-member 49 by bolts 52 and a second strap 53 is secured to the strap 51 by one of the bolts 52 and by a bolt 54. Straps 51 and 53 of the couplings are bent to set over the horizontal spindles 26 on the lower ends of the arch 18. By loosening the nut on the bolts 52 the couplings and shovel beams may be adjusted laterally upon the spindles 26 in keeping with the widths of the plant rows. The upper bolt 52 extends through a short segmental slot 55 in the strap 51 so that the angular position of the coupling 49 and shovel beams relatively to the spindles 26 of the arch may be adjusted as desired.

A raising and lowering shifter is provided for each of the supports or beams for the cultivating shovels or ground tools. Each shifter in the form shown, comprises a member 56 having a notched segment at its rear upper edge and a hand lever 57. The segment rack or member 56 is pivotally mounted at its forward end upon the out-turned, horizontal end of the adjacent lug or bracket 43. The hand lever 57 in the form shown, comprises separate parallel straps (see Figs. 1 and 9) connected together by rivets 58 and arranged on opposite sides of the segment rack 56 to which they are pivotally connected at their forward ends by a bolt 59. Each hand lever is provided with a grip or handle 60 (see Fig. 1) arranged between the rear ends of the strap that form the hand lever 57. The rear end of the outer strap is outwardly off-set as shown, to engage the outer end of the handle 60. One of the rivets 58 extends through a short arc-shaped slot 61 in the rear end of the shifting segment member 56, so that the hand lever is connected thereto by a pin and slot or lost motion connection.

A depth regulating shifter or lever 62 is mounted upon the raising and lowering shifter 56. In the form shown the lever 62 comprises two parallel straps (see Figs. 8 and 9) secured together at their upper ends and separated at their lower ends to extend over the segment 56. The lower ends of these straps are pivotally connected to the segment by the bolt 59 which is concentric with the notches and teeth of the segment. A trip 63 is pivoted on the depth regulating lever 62 and a rod 64 is connected at its outer end to the trip. At its inner end (see Figs. 1 and 2) the rod extends through slots 65 in the straps of the hand lever and forms a dog to engage the notches of the segment and lock the depth regulating lever in adjusted position upon the raising and lowering shifter or member 56. Suitable connections are provided between each depth regulating lever and the corresponding shovel beam or ground tool support. This connection is preferably made through the medium of an intermediate rock arm 66, the lower bifurcated end of which (see Figs. 1, 2, 3 and 7) sets over the side bar 15 of the frame, and is pivotally connected thereto by a bolt 67. A connecting rod or link 68 extends from the upper end of the rock arm to the depth lever 62 and engages the latter at a point adjacent its pivot. A link or rod 69 is pivotally connected at its upper end to the rock arm 66 at a point adjacent the outer end thereof. This link or rod extends downwardly and rearwardly from the rock arm and extends through an opening in a sleeve or bracket 70 (see Figs. 6 and 7) that is arranged between the bars 45 of the shovel beam and is horizontally pivoted upon a cross bolt 71, extending between the bars 45. The bracket or sleeve 70 is provided with projections 72 (see Fig. 7) which extend beneath the bars 45, and a nut 73 threaded on the end of the connecting rod 69 engages the under side of the bracket or sleeve. This one-way connection between the rod or link 69 and the shovel beam allows the latter to rise and fall as it passes over the irregularities in the ground since the rod is free to slide through the vertical opening in the sleeve 70. At the same time, the rock arm 66 and rod 69 may be moved by the depth lever 62 and raising and lowering members 56 and 57 to change the position of the shovel beam or ground tool support. A lift spring 74 is provided for each shovel beam or ground tool support. At its forward end each spring engages a hook 75 that extends through a bracket or lug 76 (see Fig. 7) secured to the upper portion of the arch 18 and to the inner face thereof by the bolt 17. An adjusting nut 77 (see Fig. 1) threaded upon the outer end of the hook, holds the hook in place and serves to adjust the tension of the lift spring 74. At its rear end (see Fig. 3) the spring is connected to a short chain 78 that engages a hook 79 swiveled on the inner end of the bolt 59 of the raising and lowering shifter or member 56.

An angular or L-shaped latch 80 is pivotally connected to the raising and lowering shifter 56 by a bolt 81 at a point adjacent the pivot bolt 59 (see Fig. 2). This latch is arranged upon the outer face of the segment or shifter 56 and is provided at its rear portion with a lug 82 (see Figs. 3 and 9) which projects through the slot 61 in the segment just above the hand lever 57.

In the lowered or working position of the shovel beam the lower hooked end 83 of the latch 80 (see Figs. 3 and 9) is arranged to engage the rear edge of the bracket 22 so as to hold the raising and lowering shifters 56 and 57 locked in position against the tension of the lift spring 74. In this position of the parts, the ends of the spring and the stud on the bracket 43 upon which the shifter 56 is mounted, are nearly in line so that the pull of the spring tends only to a slight extent to move the shift member 56. If the operator desires to raise one of the shovel beams, he lifts the hand lever 57 which, as stated and as clearly shown in Fig. 3, has a lost motion connection with the segment or shifter 56. The first portion of the movement of the hand lever will however, release the latch 80 through its engagement with the lug 82 thereon, and as soon as the lost motion between the hand lever 57 and segment 56 is taken up, the segment will be shifted about its pivot so that the lift spring 74 is brought into play to move the segment 56 and hand lever 57 into the position shown in Fig. 2 and through the medium of the rod 68, rock arm 66 and rod 69 lift the shovel beam to its inoperative position, as shown. The movement of the parts in this direction is limited by the engagement of a bolt 84 mounted on the rock arm 66 adjacent its pivot, with the upper edge of the side bar 15. The operator may quickly lower the beams and shovels again to working position by grasping the handle of the lever 57 and restoring the parts to the position shown in Fig. 3 with the hook 83 of the latch 80 in engagement with the edge of the bracket 22.

When the beams and shovels are in lower position, the working depth of the shovels may be easily and quickly regulated by shifting the regulating lever 62 on the segment 56 which is locked in adjusted position by the engagement of the end of the rod 64 with any one of the notches of the segment. This adjustment of the depth regulating lever is made independent of and without moving the raising and lowering shifter or lift spring. Moreover, although the regulating lever is shifted with the segment 56 when the latter is moved to raise and lower the shovel beams, the adjustment of the shift lever is not disturbed. If the operator has raised the shovel beams to pass over an obstruction or for other purpose, he may quickly lower them again back to the same working depths as before, by means of the hand levers 57.

It will be noted with the improved lift mechanism described, the shovel beams or supports for the ground tools may be quickly raised and lowered to working position and that in addition, suitable means are provided for regulating the working depth or extent of penetration of the ground tools, which when once adjusted, remains in adjusted position during the operation of the raising and lowering mechanism. At the same time, the shovel beams are free to rise and fall and swing laterally in working over the ground, and inasmuch as the rocker arms 66 are mounted at the forward part of the frame and substantially above the vertical pivots whereon the beams swing laterally, the lifting connections do not interfere with the lateral swing of the shovel beams. To provide additional vertical play for the shovel beams, the segment or shifting members 56 preferably rest, in the lowered or working position of the parts, upon a cushioning device comprising a cushion spring 85 (see Fig. 8) arranged within a vertical casing 86 on the bracket 22 and coiled about a central supporting bolt 87. By providing this yielding or cushioning stop for the raising and lowering shifter, the shovel beams may be depressed below their normal position to enter depressions in the ground. They are free to rise from their normal positions because of the one-way connections between the rods 69 and brackets or spools 70.

It will be noted that in the raised position of the parts shown in Fig. 2, with the stop bolt 84 on the arm 66 engaging the upper edge of the side bar 15, that the end of the rod 69 is substantially in line with the pivot 67 of the rocker arm so that a slight movement of this rocker arm will not affect the height of the shovel beam. It will also be noted that in this position, the depth lever 62 and rod 68 are so positioned that the movement of the depth lever will only shift the rocker arm to a slight extent. By reason of this arrangement, the shovel beams are always raised to substantially the same position, irrespective of the adjustment of the depth regulating lever. When the parts are in lowered position as shown in Fig. 3, they are so related that the movement of the depth lever will effect the desired adjustment of the shovel beam.

The raising and lowering mechanism is duplicated for the separate shovel or gang beams and each beam is also provided with means whereby it may be swung or guided laterally by the operator in working over the ground. For this purpose, the bracket 22 is provided at its outer end with a vertical sleeve 88 (see Figs. 2, 3 and 9) through which extends the upper end of a rock shaft 89. Shaft 89 is held in place within the sleeve 88 by a pin 90 and its lowered end is provided with a forwardly extending crank portion 91, the vertical depending end of which crank extends through an eye on the outer end of a link 92, which extends inwardly over the bars 45 of the adjacent shovel beam, and the inner downturned end of which engages a vertical opening in a bracket 93 that is secured to the inner face of the shovel beam by the bolt 71, and a second bolt 94. Arms 95 are fixed to the lower portions of the shafts 89 adjacent the cranks 91 thereon and extend inwardly therefrom. Each arm is provided at its outer end with an off-set lug 96 (see Fig. 3) which engages the adjacent crank 91. At its inner end the arm is provided with a foot-piece 97 having a heel strap 98. By means of these arms the rider may readily guide the shovel beams as desired with his feet. The foot-piece 97 is preferably connected by bolts 99 and 100 to the arm 95. The bolt 100 is arranged to engage any one of a series of holes 101 formed in the arm so that the foot-piece is adjustable in position to suit different riders. As the beams are raised and lowered the link connections 92 slide up and down on the vertical portions of the cranks 91 (see Figs. 2 and 3).

The shovel beams are connected so as to swing laterally together. This connection is formed of separate sections adjustably and yieldingly secured together so that the beams may be held at any desired distance apart, and so that they may be spread apart by the operator at any time if desired. The connection is preferably arched to extend over the row of plants, as shown in Fig. 7, and comprises a pair of upwardly and inwardly inclined links 102 and 103 which are crossed at their upper ends and connected by a pivot bolt 104. At their lower ends the links 102 and 103 are connected by horizontal pivots 105 to forked couplings 106 (see Fig. 3) which are vertically swiveled in the brackets 93 on the inner faces of the shovel beams. A rod 107 is connected to the end of the links 103 and extends through an ear or bracket 108 fixed to the central portion of the link 102. A cushion spring 109 is coiled about the rod 107 and extends between the lug or bracket 108 and a collar 110 fixed to the upper end of the rod. The upper end of the link 102 (see Figs. 1 and 7) is provided with a rearwardly bent portion or lug 111. A rod 112 connected to the link 103 extends upwardly through the lug 111 and a nut 113 is threaded on the rod and engages the lug, as shown. The cushion spring 109 tends to draw the links 102 and 103 and the shovel beams connected thereto together. By adjusting the hand nut 113, the shovel beams may be set and held at their desired distance apart. The operator by forcing forwardly on both of the foot-pieces 97, may press the shovel beams apart against the tension of the spring 109, so as to avoid obstructions or to guide the shovels in proper relation to the plant rows. When the operator relieves the pressure on the foot-pieces 97 the spring 109 will return the shovel beams to their normal position at a fixed distance apart. When the links 102 and 103 are separated by the adjustment of the nut 113 to separate the shovel beams, the straps 51 and 53 of the couplings will slide outwardly on the spindles 26 of the supporting arch 18. These straps loosely fit the spindles so as not to interfere with the vertical swing of the shovel beams.

It is obvious that numerous changes may be made in the details of construction and arrangement of parts without departure from the essentials of the invention.

Having described my invention, what I claim as new and desire to secure by Letters Patent is:—

1. In cultivators, the combination with the frame and the shovel beams hung thereon, of a pair of dependent raising and lowering shifters for said shovel beams, each comprising a segment rack pivoted on said frame and each having a raising and lowering lever for shifting the same, a depth regulating lever pivoted on each of said segment racks and arranged to be adjustably locked in position thereon, lift springs connected to said segment racks, connections between said depth regulating levers and said shovel beams, and latches for releasably holding said segment racks in position when said shovel beams are lowered, substantially as described.

2. In cultivators, the combination with the frame, of the shovel beam hung thereon, a segment rack pivoted on the frame, a depth regulating lever pivoted on said segment rack and arranged to be adjustably locked in position thereon, connections between said lever and said shovel beam, a lift spring connected to said segment rack, a latch for holding said rack in its lowered position, a shift lever for said rack having a lost motion connection therewith and arranged to trip said latch, substantially as described.

3. In a cultivator, the combination with the frame and the shovel beam hung thereon, of a segment rack pivoted to the frame, a raising and lowering lever connected to said segment rack, a depth regulating lever pivoted to said segment rack and arranged to be adjustably locked in position thereon, connections between said depth regulating lever and said shovel beam, and a cushion spring device whereon said segment rack rests in the lowered position of said shovel beam, substantially as described.

4. In a cultivator, the combination with the frame, of a shovel beam hung at the forward part of the frame, a raising and lowering shifter for said shovel beam, a depth regulating lever adjustably connected to said raising and lowering shifter, a member at the forward part of the frame, and connections extending from said depth regulating lever forwardly to said member and thence downwardly to said shovel beam, substantially as described.

5. In a cultivator, the combination with the frame and the shovel beams hung thereon, of a pair of raising and lowering shifters independently mounted upon the machine frame and each comprising an operating lever and a segment rack movably mounted on the frame, a lift spring connected to each of said shifters, latches for releasably holding the same in lowered position, depth regulating levers pivotally mounted on said segment rack and arranged to be adjustably locked in position thereon, and connections between said depth regulating levers and said shovel beams, substantially as described.

6. In cultivators, the combination with the arched wheel axle, the frame mounted thereon, and the shovel beam hung on the frame, of a raising and lowering shifter for said shovel beam movable independently of said arched axle, a depth regulating lever adjustably connected to said raising and lowering shifter but movable independently thereof and connections between said depth regulating lever and said shovel beam, substantially as described.

7. In a cultivator, the combination with the arched wheel axle, the frame mounted thereon, and the shovel beam hung on the frame, of a raising and lowering shifter for said shovel beam mounted on the frame, a lift spring connected to said shifter, a latch for releasably holding said shifter in its lowered position, a depth regulating lever adjustably connected to said shifter, and connections between said depth regulating lever and said shovel beam, said raising and lowering shifter being movable independently of said arched axle and said depth regulating lever being movable independently of said shifter and of said lift spring, substantially as described.

8. The combination with the frame, a ground tool hung thereon, of a raising and lowering shifter for said ground tool comprising a segment rack pivoted on the frame and an operating shift lever connected thereto, a pivotally mounted depth regulating lever arranged to be adjustably locked to said segment rack, connections between said depth regulating lever and said ground tool, and a yielding stop device for holding said segment rack in its lowered position, substantially as described.

9. In a cultivator, the combination with the frame, of a shovel beam hung thereon, a raising and lowering shifter and a cushion spring support whereon said shifter rests in its lowered position, substantially as described.

10. In a cultivator, the combination with the frame, of a shovel beam hung at the forward part of the frame swinging laterally and vertically, a segment rack pivoted to the rear of the frame having a raising and lowering hand lever, a depth regulating lever pivoted on said rack and arranged to be adjustably locked in position thereon, a member at the forward part of the frame and connections extending from said lever forwardly to said member and thence downwardly to the shovel beam, substantially as described.

11. In a cultivator, the combination with the frame, of the shovel beam hung at the forward part of the frame to swing laterally and vertically, a rock arm pivoted on the frame above said beam connection, a raising and lowering shifter pivoted on the frame rearwardly of said rock arm, a depth regulating lever pivoted on said shifter and arranged to be adjustably locked in position thereon, a connection from said lever to said rock arm and a connection from said rock arm to said shovel beam, substantially as described.

12. In a cultivator, the combination with the frame, of the shovel beam hung at the forward part of the frame to swing laterally and vertically, a rock arm pivoted on the frame above said beam connection, a raising and lowering shifter pivoted on the frame rearwardly of said rock arm, a depth regulating lever pivoted on said shifter and arranged to be adjustably locked in position thereon, a connecting rod from said lever to said rock arm and a connecting rod depending from said rock arm and extending loosely through a lug on said shovel beam and having means on its lowered end engaging the under side of said lug, substantially as described.

13. In a cultivator, the combination with the frame, arched axle and supporting wheels, of an arch fixed to the forward part of the frame, shovel beams connected to the lower portions of said arch to swing laterally and vertically, rock arms pivoted on the frame above said beam connections, raising and lowering shifters pivoted on the frame rearwardly of said rock arms, depth levers pivotally mounted on said shifters and arranged to be adjustably locked in position thereon, connections between said levers and said rock arms and connections between said rock arms and said shovel beams, substantially as described.

14. In a cultivator, the combination with the supporting wheels, the arched wheel axle and the frame mounted thereon, of two shovel beams hung on said frame, a pair of raising and lowering shifters mounted on the frame for independently moving said shovel beams to and from working position, a pair of depth regulating levers adjustably connected respectively to said raising and lowering shifters, and connections between each of said depth regulating levers and the corresponding shovel beams, substantially as described.

15. In a cultivator, the combination with the supporting wheels, the arched wheel axle, and the frame mounted thereon, of two shovel beams hung on said frame, a pair of shifters mounted on said frame for independently raising and lowering said shovel beams, lift springs connected respectively to said shifters, latches for releasably holding said shifters in lowered position, a pair of depth regulating levers adjustably connected to said shifters but movable independently thereof, and connections between each of said depth regulating levers and the corresponding shovel beam, substantially as described.

16. In a cultivator, the combination with the frame and shovel beam hung thereon, of a rock arm pivoted to the frame, a segment rack pivoted to the frame rearwardly of said rock arm, a depth regulating lever pivoted on said segment rack and arranged to be adjustably locked in position thereon, a connecting rod from said lever to said rock arm, a connection from said rock arm to said shovel beam, said rack having a shift lever for swinging the same above its pivot and means for locking said segment rack in position, substantially as described.

17. The combination of a frame and ground tool hung thereon, of a rock arm pivoted on the frame, a raising and lowering shifter pivoted on the frame rearwardly of said rock arm, a depth regulating lever pivoted on said shifter and arranged to be adjustably locked in position thereon, a connection between said lever and said rock arm and a connection between said rock arm and said ground tool, substantially as described.

18. In a cultivator, the combination with the frame and shovel beam hung thereon, of a rock arm pivoted on the frame, a segment rack pivoted on the frame rearwardly of said rock arm, a lift spring connected to said segment rack, said rack having an operating hand lever and a latch for holding it in lowered position, a depth regulating lever pivoted on said segment rack and arranged to be adjustably locked in position thereon, a connecting rod between said lever and said rock arm and a connecting rod between said rock arm and said shovel beam, substantially as described.

19. In a cultivator, the combination with the frame and ground tool thereon, of a segment rack pivoted on said frame, said rack having an operating hand lever and a latch for holding it in lowered position, a depth regulating lever pivoted on said segment rack and arranged to be adjustably locked in position thereon and connections between said lever and said ground tool, substantially as described.

20. In a cultivator, the combination with the frame, of a shovel beam hung thereon, a rock arm pivoted on the frame, a segment rack pivoted on the frame rearwardly of said rock arm, a depth lever pivoted on said segment rack and arranged to be adjustably locked in position thereon, a connection between said lever and rock arm and a connection between said rock arm and shovel beam, said lever, rock arm and connections being in dead center position, as described, when said shovel beam is raised.

21. In cultivators, the combination with the frame and the pair of shovel beams hung thereon, of a pair of independent raising and lowering shifters for said shovel beams, each of said shifters comprising a segment rack pivoted to the frame and an operating lever connected thereto, a pair of pivotally mounted depth regulating levers arranged to be adjustably locked to said segment racks, and connections extending respectively from said depth regulating levers to said shovel beams, substantially as described.

22. In a cultivator, the combination with the frame and the shovel beam hung thereon, of a segment rack pivoted to the frame, a raising and lowering lever connected to said segment rack, a pivotally mounted depth regulating lever arranged to be adjustably locked to said segment rack, connections between said depth regulating lever and said shovel beam, and a cushion spring device whereon said segment rack rests in the lowest position of said shovel beam, substantially as described.

23. In cultivators, the combination with the frame and the shovel beam hung thereon, of a segment rack pivoted on the frame, a pivotally mounted depth regulating lever arranged to be adjustably locked to said segment rack, connections between said depth regulating lever and said shovel beam, a latch for holding said segment rack in its lowered position, and a shift lever for said rack having a lost motion connection therewith and arranged to trip said latch, substantially as described.

24. In a straddle-row cultivator, the combination with the frame and the pair of shovel beams hung to the forward part of the frame, raising and lowering mechanism for said shovel beams, depth regulating levers for said shovel beams movable independently of said raising and lowering mechanism, guide members at the forward part of the frame, and connections extending from said depth regulating levers forwardly to said members and thence downwardly to the shovel beams, substantially as described.

25. In a cultivator, the combination with the frame, of a shovel beam hung at the forward part of the frame to swing laterally and vertically, a rock arm pivoted on the frame above said beam connection, a depth regulating lever pivotally mounted in rear of said rock arm, connections extending from said depth regulating lever forwardly to said rock arm and thence downwardly and rearwardly to said shovel beam and a raising and lowering shifter for operating said shovel beam through said connections, substantially as described.

26. In cultivators, the combination with the frame, of a shovel beam hung at the forward part of the frame, a raising and lowering shifter for said shovel beam, a rock arm pivoted to the frame above the forward end of said shovel beam, a depth regulating lever pivotally mounted in rear of said rock arm, said depth regulating lever being adjustable independently of said raising and lowering shifter, and connections extending from said depth regulating lever forwardly to said rock arm and thence downwardly and rearwardly to said shovel beam, substantially as described.

27. In a cultivator, the combination with the frame, of a shovel beam hung at the forward part of the frame to swing laterally and vertically, a member at the fore part of the frame, a raising and lowering shifter pivotally mounted at the rear of the frame, a depth regulating lever adjustably connected to said raising and lowering shifter, and connections extending from said lever forwardly to said member and thence downwardly to the shovel beam, substantially as described.

28. In a cultivator, the combination with the frame, of a shovel beam hung at the forward part of the frame to swing laterally and vertically, a rock arm pivoted on the frame above said shovel beam connection, a raising and lowering shifter pivoted on the frame rearwardly of said rock arm, a depth regulating lever adjustably locked in position to said shifter, a connection from said lever to said rock arm and a connection from said rock arm to said shovel beam, substantially as described.

CLEMENT W. MICHAEL.

Witnesses:
DANIEL EVAN HOWELL,
HARRY NEWTON DONALDSON.